Dec. 24, 1935.   W. I. CARPENTER   2,025,645
MULTIFREQUENCY TUNING SYSTEM
Filed Oct. 30, 1934   10 Sheets-Sheet 1

Inventor
Webster I. Carpenter
Geo. P. Kimmel
Attorney Dec. 24, 1935.  W. I. CARPENTER  2,025,645
MULTIFREQUENCY TUNING SYSTEM
Filed Oct. 30, 1934   10 Sheets-Sheet 7

Fig. 13.

Inventor
Webster I. Carpenter
By Geo. S. Kimmel
Attorney

Patented Dec. 24, 1935

2,025,645

UNITED STATES PATENT OFFICE 2,025,645

MULTIFREQUENCY TUNING SYSTEM

Webster I. Carpenter, Norfolk, Va.

Application October 30, 1934, Serial No. 750,692

18 Claims. (Cl. 250—40)

This invention relates to a multi-frequency tuning system, more particularly to a multi-unit all wave variable condenser having an exceedingly wide range of capacity, sufficient to cover a wide frequency range, for example the short wave bands in addition to the regular radio broadcast band and switching means for controlling the tuned circuits of radio equipment.

The invention further aims to provide, in a manner as hereinafter set forth, a multi-frequency tuning system for covering various frequency ranges and for the simultaneous control of a multiplicity of similar tuned circuits by a minimum of switching devices, requiring but one switching action to make operative any number of similar tuned circuits covering the same frequency range, but utilizing an additional switch for control of the oscillator plate circuit in superheterodyne circuits and utilizing separate switchings for controlling any number of circuits tuning different frequency ranges. The necessary switching is carried out through the use of a multi-unit variable condenser of the rotary type including sets of rotors arranged in staggered relation with respect to each other. The rotors of the set tuning the same portion of the spectrum bear the same angular relation to each other, each set of rotors for a higher or lower frequency range being arranged in a progressively staggered relation, but all rotors covering the same range bear the same angular relation to each other. The sets of rotors are so arranged about an axis that when the latter is rotated through 360°, the rotors progress through their respective stators in a direction to produce an increasing or decreasing frequency range. The switching devices are so disposed relative to the sets of rotors and to the axis of the rotors that a leading switching device operates in conjunction with its associated circuits and opens at the moment that the set of rotors of its associated condenser assembly have completed their course through the stators of such assembly and with each following switching device closing the next successive condenser assembly through to its associated circuits as the rotors of such successive assembly enter their respective stators.

A further object of the invention is to provide, in a manner as hereinafter set forth, a multi-unit variable capacity apparatus or a multi-unit condenser having staggered rotor units, with each unit having automatic circuit control, making it possible to have one condenser unit and coil very highly peaked to a part of the wave band, and with the next condenser unit likewise being highly peaked over the next assignment of wave band thereby providing a condenser that is peaked all the way from its minimum wave length to its highest wave length thereby providing for a very strong signal strength and increasing the overall efficiency of the equipment.

A further object of this invention is to provide, in a manner as hereinafter set forth, a variable condenser of simple, practical construction, having a capacity range sufficient to cover any desired frequency bands. This ability is accomplished by the novel arrangement of the parts, and determination of capacities of the units of the condenser to peak with each coil, individually, and respectively connected to that particular unit of the condenser.

A further object of the invention resides in the provision whereby as the unit rotor gradually enmeshes into the unit stator and finally reaches the point of being totally enmeshed, it is at that moment, automatically thrown out of circuit by means of an automatic switching device that will be described hereinafter, and the next unit of the condenser at the same instant, is automatically thrown into circuit, covering the next wave band; and so on throughout the entire wave bands of the condensers.

The condenser assembly is designated to complete a full turn of 360 degrees, over and over again. Starting at zero on the dial, on up to 360 degrees, and then with a slight turn of the dial, zero returns. It is thereby shown that as the full capacity of the condenser is reached and passed, it automatically drops back to the minimum capacity again. To rotate the dial in reverse order, the above facts are true in reverse order.

With the multi-unit condenser, in accordance with this invention, each unit of the condenser is peaked for highest efficiency with the one and only coil that this unit has to tune, thereby covering that particular section of the wave band with the very highest efficiency. This fact is carried out, and is true with each condenser unit, thereby making the multi-unit variable condenser a highly efficient condenser throughout all wave lengths, and at the same time covering many wave bands.

The wave bands to be covered may be divided into two or more sections as desired with a condenser group to tune each band.

A further object of the invention resides in an automatic switching means for cutting in and out each individual group of condenser units covering the different wave bands, and with the switching means so disposed that as the rotor of a unit is turned the switching means associated therewith acts to complete the circuit for this unit just at the moment that the rotor of the unit is beginning to enmesh into the stator of the unit. At this time, also the unit of the condenser preceding the aforesaid unit of the condenser, is thrown out of circuit automatically by its associated switching means. This method goes on consecutively with each unit of the condenser being thrown in and out of circuit at the proper time to avoid overlap on the tuning dial at switchings during the turning of the tuning dial.

The present method generally in daily use is to manually change the coils or else manually operate a switch that cuts out one set of coils and cuts in another set of coils. In each case the tuning dial had to be turned through its full range to completely cover each set of coils, as changed. This necessitated a great amount of turning and tuning the dials, and loss of time, etc.

A further object of the invention is to provide for plural adjustments in the switching means to simultaneously close and open the various circuits at the desired point.

A further object of the invention is to provide rotatable adjustment of the switching means about the axis or shaft whereby a circuit may be thrown into operation at an advanced or retarded position so as not to overlap the band of frequencies just above or below the aforesaid band.

To the above ends essentially, and to others which may hereinafter appear, the invention consists of such parts and such combination of parts which fall within the scope of the invention as claimed.

In the drawings:

Figure 1, Figures 10 and 11 are sectional views upon the lines 10—10 and 11—11, respectively, Figure 1a, Figure 12 is a top plan view of the tuning dial, Figure 16 is a diagrammatical view illustrating the circuit arrangement with respect to the addition of a condenser unit to the number of condenser units shown in Figures 1 and 1a.

The apparatus is illustrated by way of example (Figures 1 and 1a) with a bank of four groups of two condenser units and a switching structure associated with each group, but it is to be understood that the number of groups of units or the number of units in each group of the bank may be increased or decreased. Each unit of a group of condenser units consists of a gang or plurality of rotor plates and a gang or plurality of stator plates. The units of each group of units are of like capacity. The capacity of one group of units is different from that of an adjacent group of units.

Figure 1:
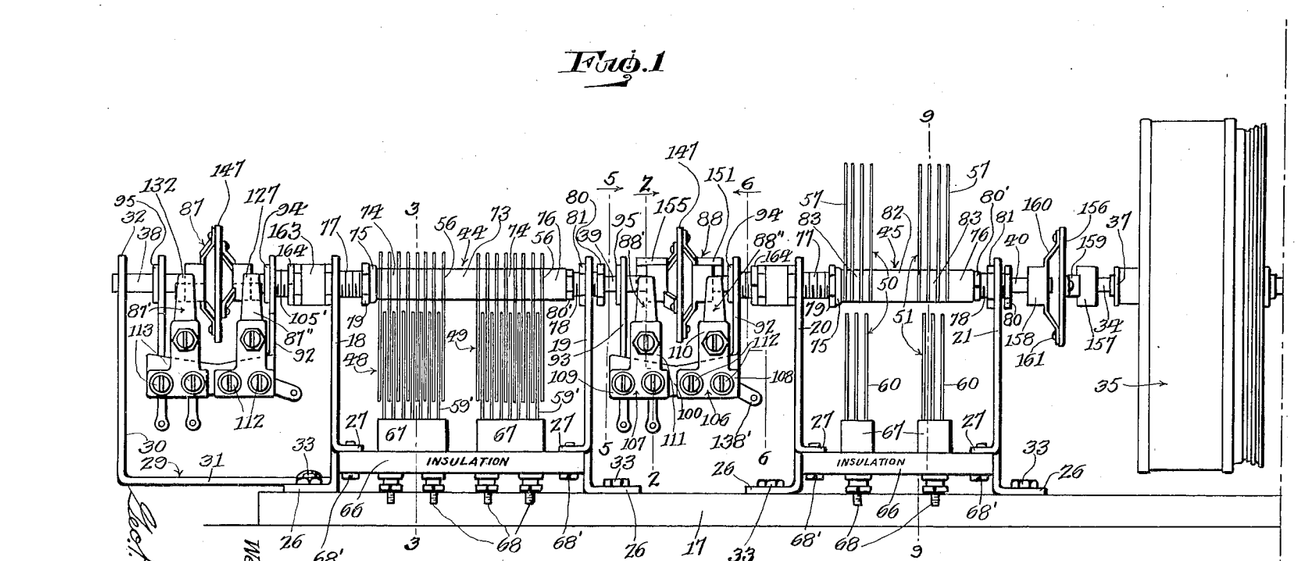
Figures 1 and 1a, when taken together, illustrate a rear elevation of the multi-unit all-wave variable condenser having combined therewith the duplex switching structures.
Figure 1A:
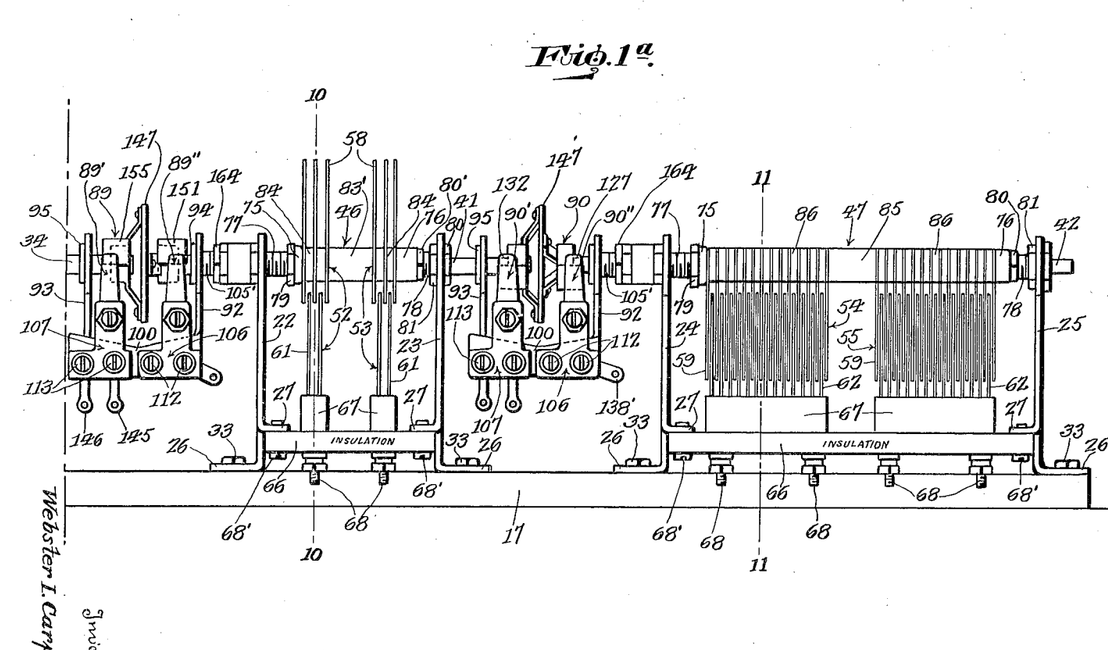
Figure 2:
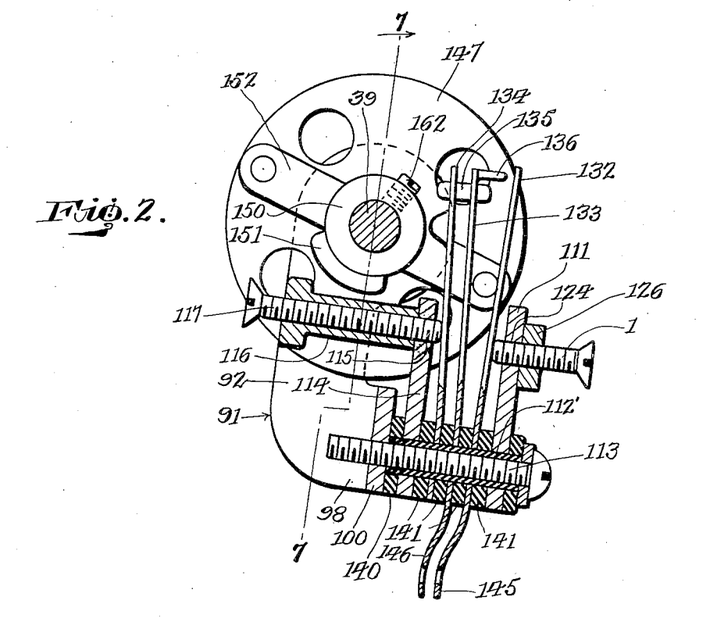
Figure 2 is a section on line 2—2, Figure 1, upon an enlarged scale.
Figure 7:
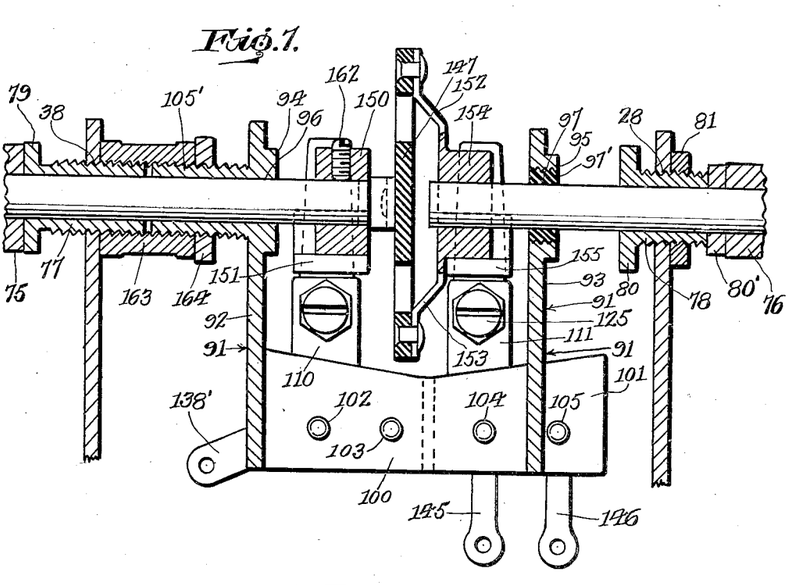
Figure 7 is a section upon line 7—7, Figure 2.
Figure 8:
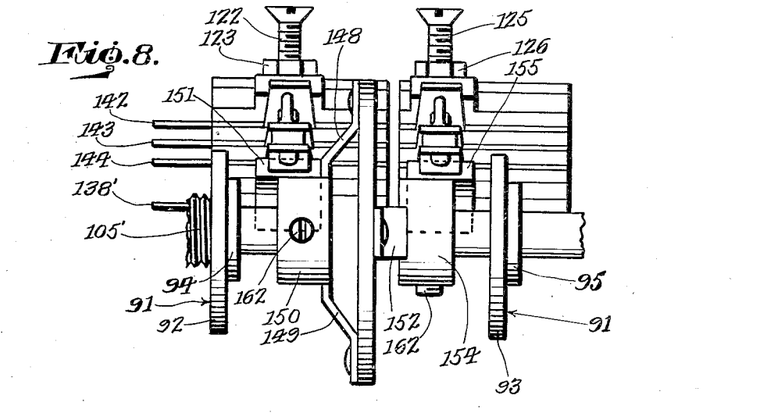
Figure 8 is a top plan view of the duplex switching structure.

With reference to Figures 1 and 1a, the apparatus includes a base 17 of any suitable material and of the desired width and length. Anchored upon the base 17 are spaced pairs of spaced standards. The standards of each pair are of like construction, but oppositely disposed with respect to each other. The standards of one pair are designated 18, 19; those of another pair at 20, 21; those of another pair at 22, 23 and those of the other pair at 24, 25. Each standard includes an outwardly directed flange means 26 at its bottom and inwardly directed spaced flanges 27 in proximity to the means 26. Each standard at its upper end is formed with an opening 28 having a threaded wall (Figure 7). Extended from one end of the base 17, as well as being secured to the flange means 26 of the standard 18, is a bracket 29 formed of a vertical and a horizontal arm 30, 31 respectively. The lower end of arm 30 merges into the outer end of arm 31. The upper end of arm 30 is formed with an opening 32 aligning with the opening 28 in the standard 18. The flange means 26 of the standards are anchored to the base 17 by the hold-fast device 33.

Figure 12:
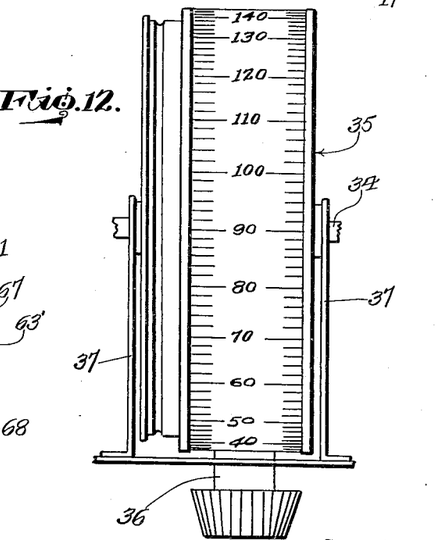

The operating shaft of the apparatus is designated 34 and is secured to in a known manner and operated from a well known form of rotatable adjustable dial and drum structure 35. The latter is operated by the well known means indicated a 36 (Figure 12). The shaft 34 is journaled in the upper ends of and extends from a pair of upstanding spaced standards 37. The latter are anchored to base 17 and arranged between and spaced from the standards 21, 22.

The apparatus includes a series of spaced shafts 38, 39, 40, 41 and 42 arranged in endwise alignment. The shafts 40 and 41 are disposed in endwise alignment with the shaft 34. The shaft 38 is termed an outer shaft. The axes of all of the shafts referred to are arranged in parallelism. All of the said shafts are coupled together to provide for their rotating in unison on the adjusting of the dial and drum structure 35.

The groups of condenser units of the bank are designated 44, 45, 46 and 47. The units of the group 44 are designated 48, 49; those of the group 45 at 50, 51; those of the group 46 at 52, 53; and those of the group 47 at 54, 55. Each unit of a group includes a gang of spaced rotors and a gang of spaced stators. The rotors of the groups of units 44, 45, 46 and 47 are indicated at 56, 57, 58 and 59 respectively. The stators of the groups of units 44, 45, 46 and 47 are designated 59', 60, 61 and 62 respectively.

That part 63 of each of the standards below the flanges 27 (Figures 3, 9, 10 and 11) is of a width corresponding to that of the base 17. That part 63' of each of the standards above the flanges 27, for a portion of the length of the standard is of oblong contour and of greater width than that of the base 17. Each standard has the bottom of its part 63' formed with a pair of the flanges 27 arranged in spaced relation. The part 63' projects from each side and the flanges 27 are arranged adjacent to the sides of base 17. That part 64 of each standard above the part 63' is substantially of triangular contour and it is formed at its upper end with a circular extension 65 provided with the opening 28.

Figure 3:
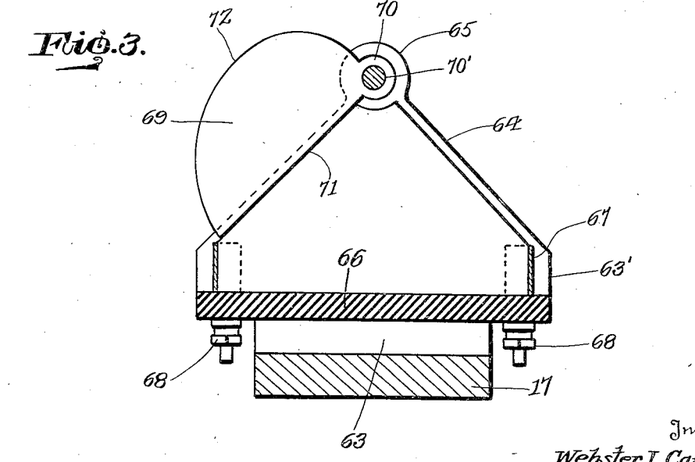
Figure 3 is a section on line 3—3, Figure 1.
Figure 4:
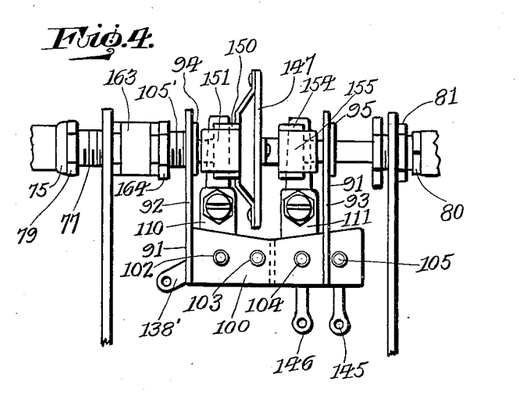
Figure 4 is a front elevation of one of the duplex switching structures.
Figure 9:
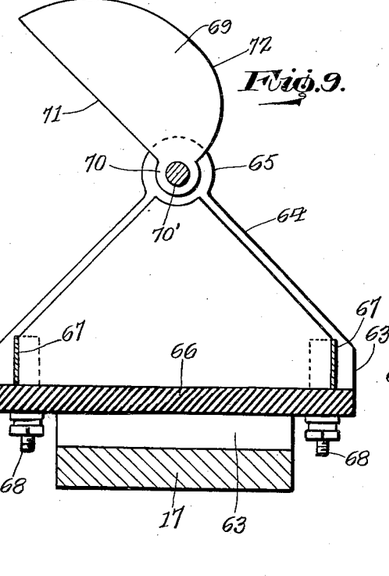
Figure 9 is a section upon line 9—9.
Figure 11:
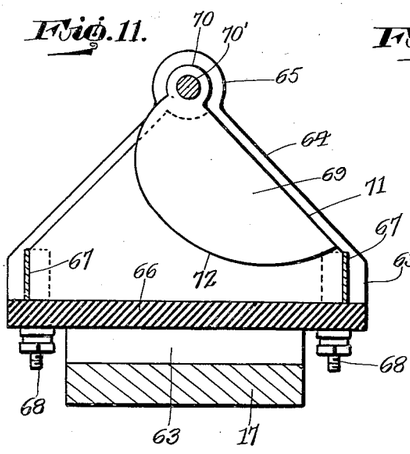

Common to the stators of each group of units is a plate 66 of insulation. The gang of stators of one unit of a group is arranged in spaced relation to the gang of stators of the other unit of the group. The gangs of stators of each group of units are positioned upon the plate 66. A pair of combined guide, spacing and holding elements 67 is carried by plate 66 for the gang of stators of each unit. Spaced binding posts 68 for circuit connections depend from plate 66 and are electrically connected with a gang of stators of each unit. As two gangs of stators are mounted on a plate 66, two spaced binding posts 68 are employed. The plate 66 is positioned against and secured to the lower faces of the flanges 27 of a pair of standards. The holdfast means for the plates 66 are indicated at 68', and which in connection with the flanges 27 suspend the plates 66 above and in spaced relation with respect to base 17. The stators of each gang are of like form and arranged in parallel spaced relation. All of the stators are of the same form. The contour of a stator is shown in Figures 3, 9 and 11.

The shafts 39, 40, 41 and 42 respectively bodily carry therewith a group of spaced gangs of rotors 44, a group of spaced gangs of rotors 45, a group of spaced gangs of rotors 46 and a group of spaced gangs of rotors 47. The groups of gangs of rotors are arranged about an axis common thereto. One group of gangs of rotors is arranged an angular distance from an adjacent group of gangs of rotors about such axis.

Figure 10:
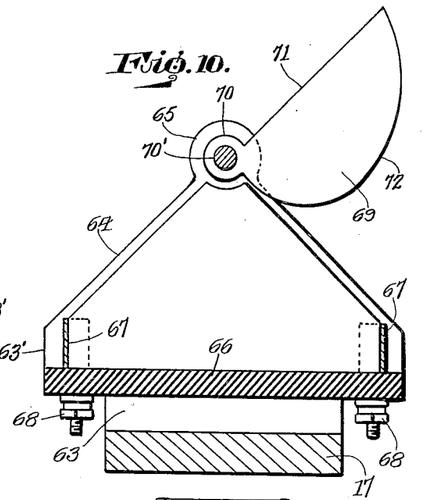

The rotors of each gang are of like form and arranged in parallel spaced relation. All of the rotors are of the same form. Each rotor includes a body part 69 having extended from one corner thereof a circular hub or extension 70 formed with an opening 70' for the passage of the shaft with which it is associated (Figure 10). The body part 69 of each rotor is of what may be termed substantially of semi-pear shape outline, and formed with two edges, one designated 71 being straight and the other designated 72 being of suitable curvature. The edges 71, 72 at one end merge into each other and at their other end merge into one side of extension 70 at spaced points on said side.

The hubs 70 of the gangs of rotors 56 of the groups of condenser units 44 are mounted upon shaft 39. Carried by the latter is a spacing collar 73 for the gangs. Spacing collars 74 are arranged between the hubs 70 of the rotors of each gang. Spacers 75, 76 on shaft 39 are arranged against the hubs 70 of outer rotors 56 of said gangs. Binding sleeves 77, 78 bear against the spacers 75, 76 respectively. The sleeves 77, 78 are formed with end flanges 79, 80 respectively. The sleeves are oppositely disposed, peripherally threaded, extend through and engage with the walls of the openings 28 at the upper ends of a pair of standards. The flanged end 79 of sleeve 77 abuts the outer end of spacer 75. A washer 80' abuts the outer end of spacer 76. The non-flanged end of sleeve 78 abuts washer 80'. A locking nut 81 is carried by sleeve 78.

The hubs 70 of the gangs of rotors 57 are mounted upon and are bodily carried with the shaft 40. The gangs of rotors 57 are maintained in spaced relation by a collar 82 positioned in shaft 40. The hubs 70 of the rotors 57 of each gang are spaced apart by collars 83 interposed therebetween and carried by shaft 40. The hubs 70 of the gangs of rotors 58 are mounted upon and bodily carried with the shaft 41. The gangs of rotors 58 are maintained in spaced relation by a collar 83' positioned on shaft 41. The hubs 70 of the rotors 58 of each gang are spaced apart by collars 84 interposed therebetween and carried by shaft 41. The hubs 70 of the gangs of rotors 59 are mounted upon and bodily carried by the shaft 42. The gangs of rotors 59 are maintained in spaced relation by a collar 85 positioned on shaft 42. The hubs 70 of the rotors 59 of each gang are spaced apart by collars 86 interposed therebetween and carried by shaft 42. There is associated with each group of condenser units 45, 46 and 47 a pair of spacing collars which are arranged in the same manner, are of the same form as that of the collars 75 and 76 and bear the same reference characters. There is associated with each group of condenser units 45, 46 and 47 a pair of binding sleeves and a lock nut which are arranged in the same manner, are of the same form as that of the sleeves 77, 78 and lock nut 81 and bear the same reference characters.

A spacer 75, a spacer 76, a sleeve 77, a sleeve 78 and a washer 80', in connection with the other collars of each group of condenser units bind the rotors of the latter together whereby each of the gangs of rotors of each group of units will bodily move together with the shaft upon which the rotors are connected to. The nuts 81 lock sleeves 78 in their adjusted positions. The rotors 56, 57, 58 and 59 bodily move together on the rotation of the shafts 39, 40, 41 and 42 from shaft 34.

The shafts 39, 40, 41 and 42 are journaled in and extend from each of the sleeves 77 and 78. The shaft 39 is coupled to shaft 40. The shaft 41 is coupled to shaft 42. The shafts 40 and 41 are coupled to the operating shaft 34. The shaft 38 is coupled to shaft 39. The coupling means between shafts 38, 39; between shafts 39 and 40; between shafts 34, 41 and between shafts 41 and 42, are of the same construction and form elements of a switching structure.

There is associated with the groups of condenser units 44, 45, 46 and 47 the controlling switching structures 87, 88, 89 and 90 respectively therefor. The switching structures are of like form and the description of one will apply to the others. With reference to Figures 2 and 4 to 8, each switching structure includes a hanger 91 formed of a pair of upstanding forwardly inclined arms 92, 93, provided in proximity to their ends with lateral enlargements 94, 95 respectively having openings 96, 97 respectively, and rearwardly extending lower end portions 98, 99 respectively. The openings 97 of the arms 93 have mounted therein the insulating bushings 97'. The arms 92, 93 have formed integral with the vertical edges of the said lower end portions 98, 99 the forward face of a vertical plate 100 which bridges the space between said arms and is of a length to extend laterally at one end, as at 101 from the outer side of end portion 99. The plate 100 is provided with screw threaded openings 102, 103, 104 and 105. Formed integral with the outer side face of the arm 92 and disposed at right angles thereto is a peripherally threaded tubular extension 105' having its inner face forming a flush continuation of the wall of opening 96.

Opposing in spaced relation the rear face of plate 100 is a pair of upstanding supports 106, 107 of substantially inverted T-shape formed with bases 108, 109 respectively and stems 110, 111 respectively. The base 108 is formed with openings aligning with the openings 102, 103. The base 109 is formed with openings aligning with the openings 104, 105. Extending through the base 108 and threadedly engaging with the walls of the openings 104, 105 is a pair of spaced headed binding screws 112. Each binding screw has arranged thereon a sleeve 112' of insulation which extends to the plate 100. The sleeve is of less length than the screw. Mounted on the sleeves 112', carried by the screws 113 is an upstanding support 114 (Figure 2) formed at its upper end with a screw threaded opening 115 which registers with a forwardly directed, interiorly threaded lock nut tubular member 116, having extending therethrough and threadedly engaging therewith an adjusting screw 117 for a purpose to be referred to. The screw 117 also engages the wall of opening 115. Mounted on the sleeves 112', carried by the screws 112, is an upstanding support 118 (Figure 6) of the same form as the support 114. Connected to and extending forwardly from support 118 is a tubular member 119 of the same form as the member 116. Extending through and threadedly engaging with member 119 is an adjusting screw 120 for a purpose to be referred to. The stem 110 is formed with a screw threaded opening 121 with which threadedly engages an adjusting screw 122 for a purpose to be referred to. The screw 122 carries a lock nut 123. The stem 111 is formed with a screw threaded opening 124 with which threadedly engages an adjusting screw 125 for a purpose to be referred to. The screw 125 carries a lock nut 126.

Figure 5:
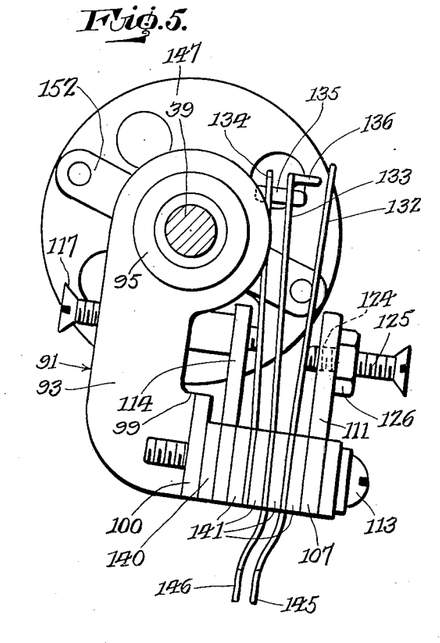
Figures 5 and 6 are sectional views upon the lines 5—5, and 6—6, respectively, Figure 1.
Figure 6:
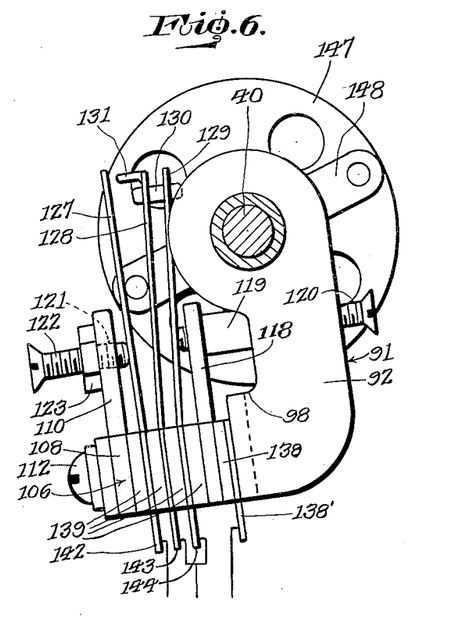

Mounted on the sleeves 112', carried by the binding screws 112 is an upstanding normally open circuit closing unit consisting of a set of resilient brushes 127, 128 and 129 (Figure 6). The brushes 128 and 129 are connected together in spaced relation in proximity to their outer ends by a coupling piece 130 of insulation. The brush 128 at its outer end is formed with a contact point 131 which extends towards brush 127. The latter is normally spaced from the point 131. The brushes 128, 129 are moved in unison by a means to be referred to in a direction to bring the point 131 to engage brush 127 to close the circuit. Mounted on the sleeves 112' carried by the binding screws 113 is an upstanding normally open circuit closing unit consisting of a set of resilient brushes 132, 133 and 134 (Figure 5). The brushes 133 and 134 are connected together in spaced relation in proximity to their outer ends by a coupling piece 135 of insulation. The brush 133 at its outer end is formed with a contact point 136 which extends toward brush 132. The brushes 133, 134 are moved in unison, by a means to be referred to in a direction to bring the point 136 to engage brush 132 to close the circuit.

Mounted on the sleeves 112' carried by the screws 112 and spaced from plate 100 (Figure 6) are the insulators 138. Carried by the sleeves 112' on the screws 112 and interposed between insulators 138 and plates 100 are the terminals 138'. Positioned on the sleeves 112' carried by the screws 112 are sets of insulators 139 which are interposed between brushes 127, 128, 129 and supports 118. Mounted on the sleeves 112' carried by screws 113 and bearing against plate 100 (Figures 2 and 5) is an insulator 140. Positioned on the sleeves 112', carried by the screws 113 are sets of insulators 141 which are interposed between brushes 132, 133, 134 and supports 114. The insulators 138 and 140 are arranged against the supports 118 and 114 respectively.

The brushes 127, 128 and 129 are extended from the insulators 139 and provide terminals 142, 143, 144 respectively. The brushes 132 and 133 are extended from the insulators 141 and provide terminals 145, 146 respectively.

The brushes 127, 129 are arranged in the path of the adjusting screws 122, 120 respectively, to be independently adjusted by the latter whereby the space between point 131 and brush 127 may be varied and the tension of brushes 127, 128 and 129 may be increased or reduced. The brushes 132, 134 are arranged in the path of the adjusting screws 125, 117 respectively to be independently adjusted by the latter whereby the space between point 136 and brush 132 may be varied and the tension of the brushes 132, 133 and 134 increased or decreased.

The sets of brushes 127, 128 and 129 of the switching structures 87, 88, 89 and 90 are generally indicated at 87'', 88'', 89'' and 90'' respectively. The sets of brushes 132, 133 and 134 of the switching structures 87, 88, 89 and 90 are generally indicated at 87', 88', 89' and 90' respectively.

Each switching structure includes as heretofore described, two sets of switching elements or brushes, each set forming a circuit closing unit. The said sets of elements or brushes are operated simultaneously to circuit closing positions by a device to be referred to.

Each switching structure includes a device for simultaneously operating its sets of brushes and the said device also acts as a coupling means between shafts 38, 39 or shafts 39, 40 or shafts 34, 41 or shafts 41, 42. Each of the said devices is of like form and the description of one will apply to the others. However, before describing the construction of such devices it will be pointed out, with reference to Figures 1 and 1ª, that the hanger 92 of switching structure 87 is suspended from shafts 38, 39; that of switching structure 88 from shafts 39, 40; that of switching structure 89 from shafts 34, 41 and that of switching structure 90 from shafts 41, 42. The manner in which a switching structure is suspended is clearly shown in Figure 7. Each of said devices is termed a combined shaft coupling and switch operating element, and consists of a vertically disposed rotatable apertured disc 147 of non-conducting material having anchored to and opposing one side face thereof the outer ends of a pair of oppositely disposed angle-shaped outwardly directed arms 148, 149 (Figures 7 and 8) merging at their inner ends in a collar 150 formed with a cam 151 disposed circumferentially of its outer edge. Anchored to and opposing the other side face of the disc 147 is a pair of oppositely disposed angle-shaped outwardly directed arms 152, 153 merging at their inner ends in a collar 154 formed with a cam 155 disposed circumferentially of its outer edge. The cams 151, 155 are arranged in sidewise parallel spaced relation. The brush 129 is positioned in the path of cam 151 to be shifted by the latter on the rotation of the disc 147. The brush 134 is positioned in the path of the cam 155 to be shifted thereby on the rotation of disc 147. When the brushes 129, 134 are shifted by cams 151, 155 they respectively close the circuit for a group of condenser units and the circuit for the oscillator plate.

The collars 150, 154 of the switching structure 87 are fixed to the shafts 38, 39 and couple shafts 38, 39 together whereby the collars, as well as said shafts, will be rotated in unison. The collars 150, 154 of the switching structure 88 are fixed to the shafts 39, 40 and couple shafts 39, 40 together whereby the collars of structure 87, 88 and shafts 38, 39, 40 will be rotated in unison. The collars 150, 154 of the switching structure 89 are fixed to the shafts 34, 41 and couple shafts 34, 41 together whereby the collars of structure 89 as well as the shafts 34, 41 will be rotated in unison. The collars 150, 154 of the switching structure 90 are fixed to the shafts 41, 42 and couple shafts 41, 42 together whereby the collars of structures 89, 90 and shafts 34, 41 and 42 will be rotated in unison. To provide for the shafts 34, 38, 39, 40, 41 and 42 to rotate in unison, the shaft 34 is coupled to shaft 40, and for such purpose a disc 156 of insulation is interposed in spaced relation between the opposed ends of shafts 34, 40. Secured to and suitably insulated from the opposed ends of the shafts 34, 40 are collars 157, 158 respectively. The collar 157 is connected to one side of disc 156 by a pair of oppositely extending arms 159. The collar 158 is secured to the disc 156 by a pair of oppositely extending arms 160. The arms 159, 160 are integral at one end with collars 157, 158 respectively and have their other ends anchored to disc 156 by holdfast means 161.

A disc 147 is arranged between and spaced from the opposed ends of shafts 38, 39; between and spaced from the opposed ends of shafts 39, 40; between and spaced from the opposed ends of shafts 34, 41; and between and spaced from the opposed ends of shafts 41, 42.

Each switching structure is detachably secured in position whereby it may be removed when desired, and for such purpose its collars 150, 154 are secured in position by removable set screws 162 and its tubular member 105' extending towards sleeve 77. A member 105' is mounted on a shaft 39, 40, 41 or 42. Threadedly engaging with sleeve 77 and member 105' (Figure 7) is an interiorly threaded coupling sleeve 163. A lock nut 164 is carried by member 105'.

The shafts 34, 38, 39, 40, 41 and 42 provide a common axis for the hubs 70 of the rotors and for the collars 150, 154. The rotors 56, 57, 58 and 59 are arranged in staggered relation with respect to each other about said common axis. The cams of said switching structures are arranged in staggered relation about said common axis. The cams of one switching structure are arranged a distance of ninety degrees from the cams of an adjacent switching structure and a like arrangement has been heretofore referred to with respect to the rotors of the said pairs of condenser units. It is to be understood that when a greater or smaller number of groups of condenser units are used than that as shown that the distance between the rotors of said groups may be changed and the foregoing may also apply to the cams of the switching structures when the number of the latter is increased or decreased.

Figure 13:
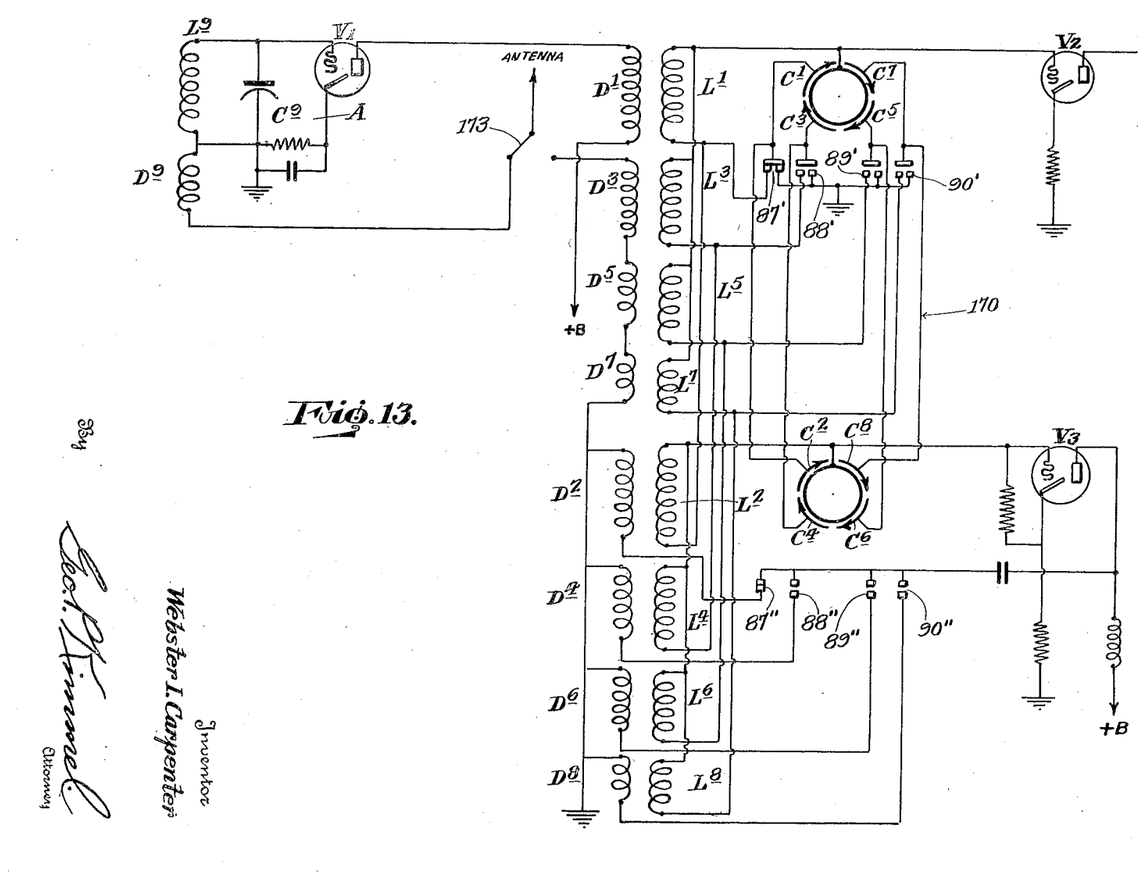
Figure 13 is a diagrammatical view illustrating a superheterodyne circuit with the condenser units shown schematically and with the switching structures of the double-pole type.

With reference to Figure 13, a superheterodyne circuit arrangement 170 is set up with respect to nine condenser groups, the ninth being designated $C^9$. The other condenser units are designated $C^1$, $C^3$, $C^5$, and $C^7$. The units $C^1$, $C^3$, $C^5$ and $C^7$ are associated with the condenser units $C^2$, $C^4$, $C^6$, $C^8$ respectively. The associated units of each pair, or group, have their circuit closed simultaneously and independently of the other associated units of said pairs or group, and the unit $C^9$. The circuit 170 includes a switch 173 for connecting thru element $L^9$ the antennæ, not shown, to a radio frequency amplifier A. Simultaneously with the closing of the switch 173, to element $D^9$, the switching structure 87 is closed making active circuits $L^1$—$C^1$, and $L^2$—$C^2$. The arrangement just referred to is the first position. As the shafts revolve into the second position, the switch 173 is connected to elements $D^3$, $D^5$ and $D^7$ and these latter remain in this position for the remainder of the revolution of the shafts until position one is again reached. Simultaneously with the changing of switch 173 the units 88' and 88" close making operative circuits $L^3$—$C^3$ and $L^4$—$C^4$, but making circuit $L^9$—$C^9$ inoperative until position one is again reached. The circuits $L^3$—$C^3$ and $L^4$—$C^4$ are receptive to a band of frequencies adjacent to the band covered by $L^1$—$C^1$ and $L^2$—$C^2$ but slightly overlap them. As the shafts are further revolved into position three, the switch 173 remains as in position two and the units 88' and 88" open and simultaneously with the opening of the latter the units 89' and 89" close making operative circuits $L^5$—$C^5$ and $L^6$—$C^6$ receptive to a band of frequencies adjacent to the band receptive by the circuits $L^3$—$C^3$ and $L^4$—$C^4$ but slightly overlapping it. Further revolution of the shafts makes position four without changing the position of switch 173 whereby the units 89' and 89" open, and simultaneously with the opening of the latter the units 90' and 90" are closing, making operative circuits $L^7$—$C^7$ and $L^8$—$C^8$ covering a band of frequencies adjacent to the band covered by $L^5$—$C^5$ and $L^6$—$C^6$. Upon further turning of the dial or shafts the switch 173 disconnects from coils $D^3$, $D^5$ and $D^7$ and connects to circuit $L^9$—$C^9$, which is back to first position again with the units 87' and 87" closed, but units 88' and 88", 89' and 89" and 90' and 90" open. The switch 173 is necessary to connect the antenna to either radio frequency stage for broadcast band pre-selection or to the mixer direct for short wave operation.

Figure 14:
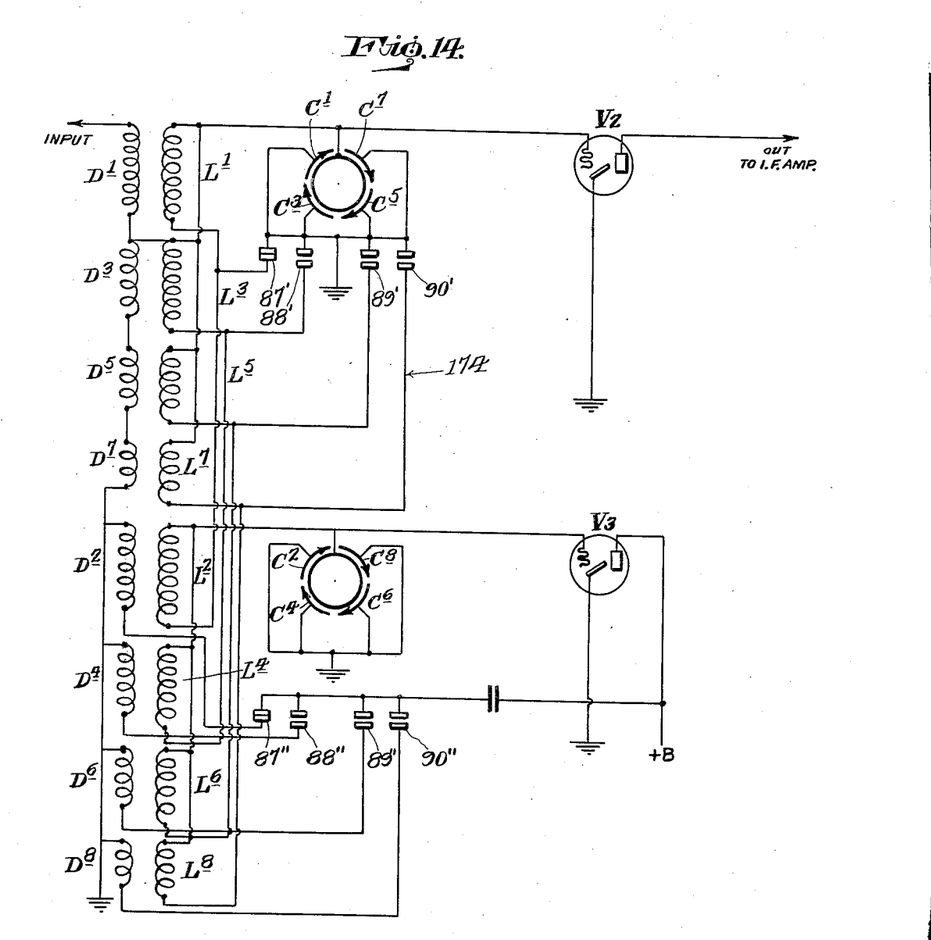
Figure 14 is a view similar to Figure 13 with the switches of the single-pole type.

With reference to Figure 14, a superheterodyne circuit 174 is shown similar to circuit 170 except single pole type switches are utilized instead of multiple pole switches. Figure 14 is a diagrammatical view of a circuit arrangement 174 set up with respect to eight condenser units employing single pole switches to control the different circuits. The condenser units are $C^1$, $C^3$, $C^5$ and $C^7$, and associated with the said condenser units are $C^2$, $C^4$, $C^6$ and $C^8$ respectively. The associated units of each pair have their circuit controlled simultaneously and independently of the other associated units of said group. With units 87'—87" closed, circuits $L^1$—$C^1$ and $L^2$—$C^2$ are made operative, and the arrangement just referred to is the first position. The units 88'—88", 89'—89" and 90'—90" are open in the first position. As the shafts are further turned into position two, units 87'—87" open and simultaneously units 88'—88" close making operative circuits $L^3$—$C^3$ and $L^4$—$C^4$. In position two, circuits $L^1$—$C^1$, $L^5$—$C^5$, $L^7$—$C^7$, $L^2$—$C^2$, $L^6$—$C^6$ and $L^8$—$C^8$ are inoperative. As the tuning dial is turned further to position three, units 88'—88" open and simultaneously units 89'—89" close making operative circuits $L^5$—$C^5$ and $L^6$—$C^6$, but with circuits $L^1$—$C^1$, $L^3$—$C^3$, $L^7$—$C^7$, $L^2$—$C^2$, $L^4$—$C^4$ and $L^8$—$C^8$ inoperative. As the dial is turned further to position four, units 89'—89" open and simultaneously units 90'—90" close making operative circuits $L^7$—$C^7$ and $L^8$—$C^8$, but with circuits $L^1$—$C^1$, $L^3$—$C^3$, $L^5$—$C^5$, $L^2$—$C^2$, $L^4$—$C^4$ and $L^6$—$C^6$ inoperative. As the tuning dial is further turned, position one is reached again with units 87'—87" closed making operative circuits $L^1$—$C^1$ and $L^2$—$C^2$, but circuits $L^7$—$C^7$, $L^8$—$C^8$, $L^3$—$C^3$, $L^4$—$C^4$, $L^5$—$C^5$ and $L^6$—$C^6$ inoperative.

Figure 15:
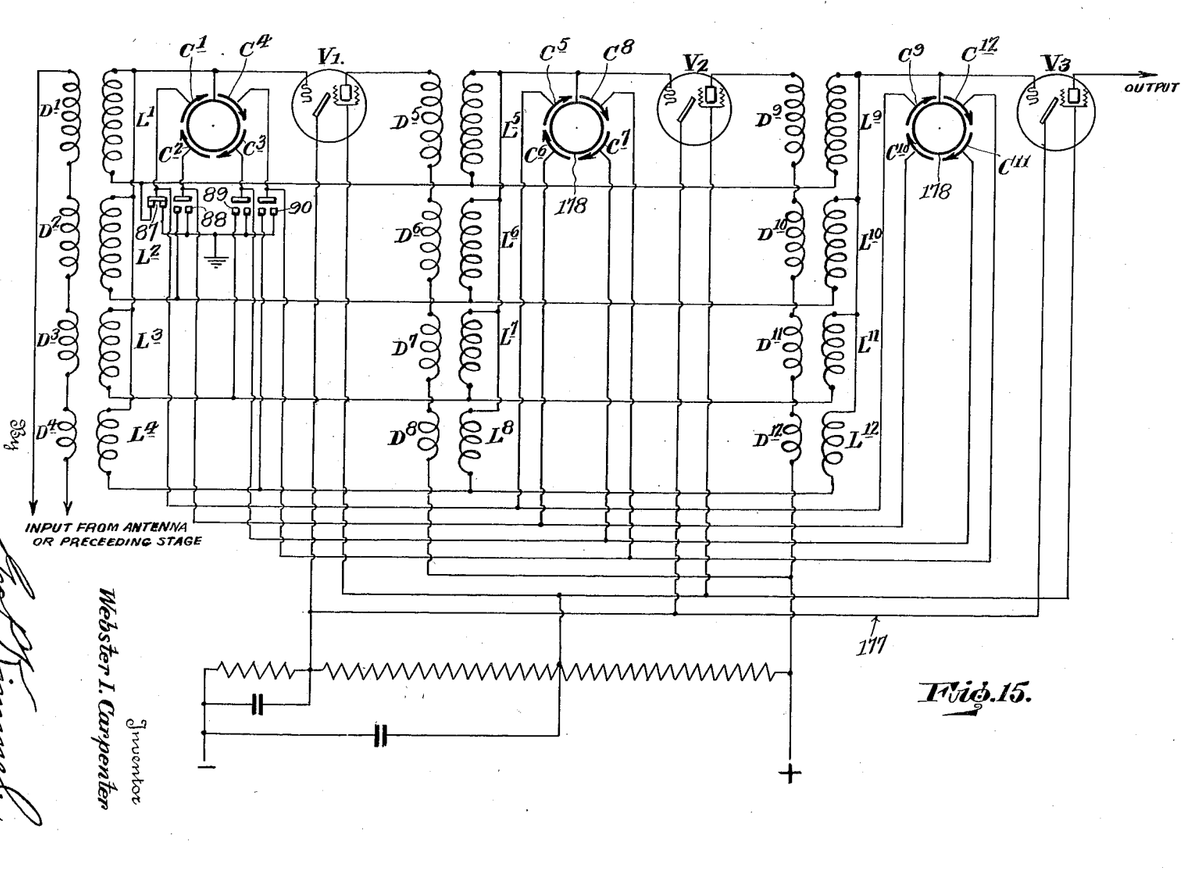
Figure 15 is a diagrammatical view of a tuned radio frequency circuit with respect to twelve condenser units and with the latter shown schematically.

With reference to Figure 15 it illustrates a tuned radio frequency circuit 177 with twelve condenser units using multiple pole switching means. The condenser units are $C^1$, $C^2$, $C^3$ and $C^4$. Associated with $C^1$ are $C^5$ and $C^9$. Associated with $C^2$ are $C^6$ and $C^{10}$. Associated with $C^3$ are $C^7$ and $C^{11}$. Associated with $C^4$ are $C^8$ and $C^{12}$. With the closing of switching means 87 circuits $L^1$—$C^1$, $L^5$—$C^5$ and $L^9$—$C^9$ are made operative. All of the other remaining circuits are inoperative with the circuits controlled by switching means 88, 89, and 90 open. This arrangement just referred to is the first position. With further turning of the tuning dial switching means 87 opens and simultaneously switching means 88 closes making circuits $L^2$—$C^2$, $L^6$—$C^6$ and $L^{10}$—$C^{10}$ operative but making circuits $L^1$—$C^1$, $L^5$—$C^5$ and $L^9$—$C^9$ inoperative. Circuits controlled by switching means 89 and 90 are also inoperative during the second position. With further turning of the tuning dial switching means 88 opens and simultaneously switching means 89 closes making operative circuits $L^3$—$C^3$, $L^7$—$C^7$ and $L^{11}$—$C^{11}$, which is the third position wherein with the opening of switching means 88 circuits controlled thereby, namely; $L^2$—$C^2$, $L^6$—$C^6$ and $L^{10}$—$C^{10}$, also circuits controlled by switching means 87 and 90 are inoperative. With further turning of the tuning dial position four is reached with the opening of switching means 89 and the simultaneous closing of switching means 90 making operative circuits $L^4$—$C^4$, $L^8$—$C^8$ and $L^{12}$—$C^{12}$ but making inoperative circuits $L^3$—$C^3$, $L^7$—$C^7$ and $L^{11}$—$C^{11}$, also circuits controlled by switching means 87 and 88 are inoperative in the fourth position. With further turning of the tuning dial position one is reached again with the opening of switching means 90 and the simultaneous closing of switching means 87 making operative circuits $L^1$—$C^1$, $L^5$—$C^5$ and $L^9$—$C^9$, but with circuits $L^4$—$C^4$, $L^8$—$C^8$ and $L^{12}$—$C^{12}$ inoperative, also circuits controlled by switching means 88 and 89 remain inoperative in position one.

Figure 16:
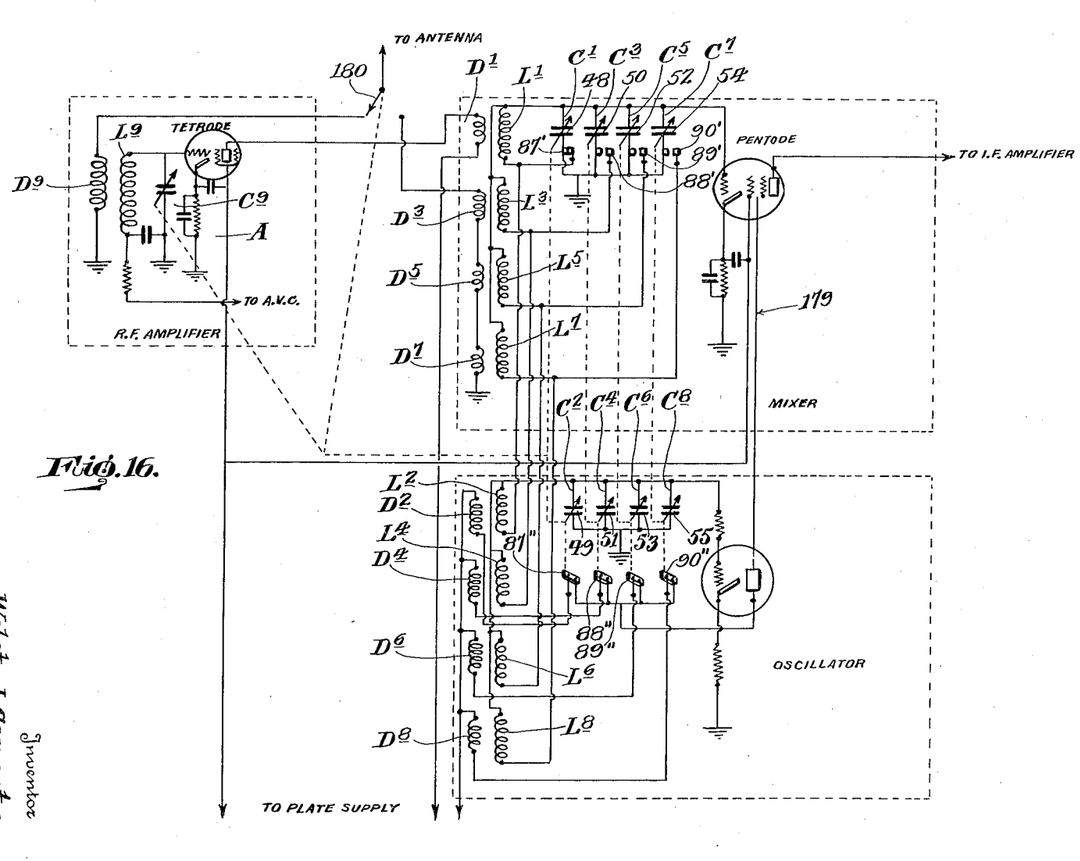

Figure 16 is a diagrammatical view of a circuit arrangement 179 set up with respect to nine condenser units, the ninth being designated $C^9$. The other condenser units are designated 48, 49, 50, 51, 52, 53, 54 and 55. The units 48, 50, 52 and 54 are associated with the units 49, 51, 53 and 55 respectively. The associated units of each group have their circuit closed simultaneously and independently of the other associated units of said groups and the group $C^9$. The circuit 179 includes a switch 180 for connecting through element $D^9$ the antenna, not shown, to the radio frequency amplifier A. Simultaneously with the closing of the switch 180, the units 87′ and 87″ are closed making active circuits $L^1$—$C^1$ and $L^2$—$C^2$.

The arrangement just referred to is the first position. As the shafts revolve into the second position, the switch 180 is connected to $D^3$, $D^5$ and $D^7$ and these latter remain in this position for the remainder of the revolution of the shafts until position one is again reached. Simultaneously with the changing of switch 180 the units 87′ and 87″ are opened and the units 88′ and 88″ close making operative circuits $L^3$—$C^3$ and $L^4$—$C^4$, but making circuit $L^9$—$C^9$ inoperative until position one is again reached. The circuits $L^3$—$C^3$ and $L^4$—$C^4$ are receptive to a band of frequencies adjacent to the band covered by circuit $L^1$—$C^1$ and $L^2$—$C^2$ but slightly overlap them. As the shafts are further revolved into position three, the switch 180 remains as in position two and the units 88′ and 88″ are opened and simultaneously with the opening of the latter the units 89′ and 89″ close making operative circuits $L^5$—$C^5$ and $L^6$—$C^6$ receptive to a band of frequencies adjacent to the band receptive by the circuits $L^3$—$C^3$ and $L^4$—$C^4$ but slightly overlapping it. Upon further revolution of the shafts makes position four without changing the position of switch 180 whereby the units 89′ and 89″ open and simultaneously with the opening of the latter, the units 90′ and 90″ are closed, making operative circuits $L^7$—$C^7$ and $L^8$—$C^8$ covering a band of frequencies adjacent to the band covered by circuits $L^5$—$C^5$ and $L^6$—$C^6$, but slightly overlapping them. Further turning of dial, switch 180 disconnects from $D^3$, $D^5$ and $D^7$ and connects to $L^9$—$C^9$, which is back to first position again with units 87′ and 87″ closed but units 88′, 88″, 89′, 89″, 90′ and 90″ open.

It will be noted that while the grid inductances of both the mixer and oscillator circuits are simultaneously made either operative or inoperative through the action of one of the circuit closing members of the switch devices, elements $D^2$, $D^4$, $D^6$ and $D^8$ are also controlled through the action of the other circuit closing members of the switches and which members are operated simultaneously by virtue of bearing the same physical and electrical relationship to each other according to their relative positions with respect to the shafts.

The true associated control circuit is accomplished through the fact that one of the circuit closing members of each of the switches acts in a manner to simultaneously control the circuits of both the mixer and oscillator grid inductances. The other circuit closing member of each of the 35 switches plays no part in the associated control circuit, except that they are necessary to make the oscillator circuit operative. The circuit closing members of each switch operate simultaneously only because of the fact that the oscillator plate inductance must match its associated grid inductance to make the oscillator circuit operative.

The rotary units employed in connection with the short wave band do not trail in the same path on rotation. The rotary units employed in connection with regular broadcast band do not trail in the same path on rotation.

Each switching structure is formed of a rotatable section and a suspended section. The rotatable section being the parts of the structure which constitute the coupling means between a pair of shafts, and the suspended section is formed from the hanger 91 and the parts carried by the latter. As the suspended section is connected to a pair of shafts by the lock nut 164 such section may be adjusted circumferentially with respect to the shafts by loosening lock nut 164 and rotating extension 105′ in sleeve 163 to the desired position of suspended section and then retighten lock nut 164. The position of the suspended section of one switching structure with respect to that of an adjacent switching structure is such as to cause the simultaneous closing of one pair of circuit closing units on the opening of an adjacent pair of circuit closing units. Each pair of cams is of a width to insure the riding of them against the brushes of the circuit closing units with which they are associated. As shown, the cams are extended laterally from the collars.

What I claim is:

1. In a multi-frequency tuning system for covering various frequency ranges, a bank of groups of condenser units, each unit of a group including ganged rotors and ganged stators, one group of units tuning the same portion of the spectrum and a portion different from that tuned by any of the other groups, a rotatable means common to the gangs of rotors, said gangs of rotors being angularly disposed with respect to and arranged in staggered relation about said means, the gangs of rotors tuning the same portion of the spectrum bearing the same angular relation to each other, each higher or lower range tuning group of units being disposed in a progressively staggered relation, said groups of gangs of rotors being so arranged about said rotatable means that when the latter is rotated 360° each group of gangs of rotors progress through their associated gangs of stators in a direction which produces an increasing or decreasing frequency range, a normally open pair of circuit closing units suspended from said rotatable means for each group of condenser units and arranged adjacent to the latter, and a rotatable operating device for each pair of circuit closing units, each of said devices forming a part of said rotatable means and including a pair of spaced elements for simultaneously closing the pair of circuit closing units with which the device is associated, the said spaced elements of said devices being disposed about said rotatable means in staggered relation with respect to each other and corresponding in arrangement to the staggered arrangement of said groups of gangs of rotors whereby on the operation of said rotatable means the closing of one pair of circuit closing units will be had on the opening of an adjacent pair of circuit closing units.

2. In a multi-frequency tuning system as set forth in claim 1, the spaced elements of each of the operating devices for the circuit closing units being in the form of a pair of spaced parallel cams of like construction.

3. In a multi-frequency tuning system as set forth in claim 1, having the said rotatable means thereof consisting of a series of aligned shafts, a coupling means between an intermediate pair of said shafts and the circuit closing units operating devices, the said devices connecting the other of said shafts together and to the said intermediate shafts.

4. In a multi-frequency tuning system as set forth in claim 1, a support for said rotatable means, and coacting means on said rotatable means and on the suspension for each pair of circuit closing units for detachably securing the suspensions to the said rotatable means.

5. In a multi-frequency tuning system as set forth in claim 1, the said rotatable means being formed from a series of aligned shafts, a coupling means between an intermediate pair of said shafts and the circuit closing units operating devices, said devices connecting the other of said shafts together and to the said intermediate shafts, said devices and coupling means being detachably secured to said shafts.

6. In a multi-frequency tuning system for covering various frequency ranges, a bank of groups of condenser units, each unit of a group of units including a gang of rotors and a gang of stators, one group of units tuning the same portion of the spectrum and a portion different from that tuned by any of the other groups of units, an operating shaft, a shaft for each group of gangs of rotors, an outer shaft, said shafts being disposed in aligned relation and electrically insulated from each other shaft, an insulated coupling means between said operating shaft and one of the shafts carrying a group of gangs of rotors, a switching structure for each group of condenser units and including an operating means therefor, said structures including electrically insulated rotatable means for coupling the others of said shafts and the operating shaft together, the said coupling means and said shafts providing a rotatable element common to the said groups of gangs of rotors, the said groups of gangs of rotors being angularly disposed with respect to and arranged in staggered relation about said element, the gangs of rotors tuning the same portion of the spectrum bearing the same angular relation to each other, each higher or lower range tuning group of condenser units being disposed in staggered relation, said groups of gangs of rotors being arranged about said rotatable element whereby when the latter is rotated 360° each group of gangs of rotors progress through their associated gangs of stators in a direction which produces an increasing or decreasing frequency range, the said coupling means of each of said structures carrying the operating means for the latter, the said operating means of said structures being so disposed about said rotatable element in staggered spaced relation to each other and corresponding in arrangement to the staggered spaced relation of said groups of gangs of rotors whereby on the rotation of said element the closing of one switching structure will be had on the opening of an adjacent switching structure.

7. In a multi-frequency tuning system as set forth in claim 6, having a selectively operable plural adjusting means for each switching structure.

8. In a multi-frequency tuning system as set forth in claim 6, having means for adjustably connecting the coupling means forming a part of each of the switching structures to a pair of shafts.

9. In a multi-frequency tuning system as set forth in claim 6, having the said operating means for each of said structures consisting of a pair of spaced parallel cams of like form.

10. In a multi-frequency tuning system for covering various frequency ranges, a bank of groups of condenser units, each unit of a group of units including a gang of rotors and a gang of stators, one group of units tuning the same portion of the spectrum and a portion different from that tuned by any of the other groups of units, an operating shaft, a shaft for each group of gangs of rotors, an outer shaft, said shafts being disposed in aligned relation and electrically insulated from each other shaft, an insulated coupling means between said shafts carrying a group of gangs of rotors, a switching structure for each group of condenser units, each structure including a rotatable section and a suspended section carrying spaced normally open circuit closing units, said suspended section being suspended from portions of a pair of aligned shafts, said rotatable section coupling the said pair of aligned shafts together, said coupling means, rotatable sections and shafts providing a rotatable element common to the said groups of gangs of rotors, the said groups of gangs of rotors being angularly disposed with respect to and arranged in staggered relation about said element, the gangs of rotors tuning the same portion of the spectrum bearing the same angular relation to each other, each higher or lower range tuning group of condenser units being disposed in staggered relation, said groups of gangs of rotors being arranged about said rotatable element whereby when the latter is rotated 360° each group of gangs of rotors progress through said associated stators in a direction which produces an increasing or decreasing frequency range, the rotatable section of each switching structure carrying the operating means for the group circuit closing units of the structure, the said operating means for the circuit closing units of said structures being so disposed about said rotatable element in staggered spaced relation with respect to each other and corresponding in arrangement to the staggered spaced relation of said groups of gangs of rotors whereby on the rotation of said element the closing of one group of circuit closing units will be had on the opening of an adjacent group of circuit closing units.

11. In a multi-frequency tuning system as set forth in claim 10, having a selectively operable plural adjusting means for each circuit closing unit of a switching structure.

12. In a multi-frequency tuning system as set forth in claim 6, having a selectively operable rotatable adjusting means for each of said switching structures.

13. In a multiple frequency tuning system, as set forth in claim 10, having means on the suspended section of each switching structure whereby the circumferential adjustment of the latter may be had with respect to its suspension means to prevent overlapping of the wave bands.

14. In a multiple frequency tuning system, as set forth in claim 10, having means forming a part of each switching structure coacting with the suspension means for said structure to provide for the advance or delay of the switching action for the gang of condenser units with which it is associated whereby said structure will cut in and out of circuit the said gang of condenser units at the point where the gang of condenser units next above or below take up.

15. In a multi-frequency tuning system, as set forth in claim 1, a support for said rotatable means, and adjusting coactable means on said rotatable means and on the suspension for each pair of circuit closing units for detachably securing the suspension to the said rotatable means to prevent overlap on tuning the dial between the several tuned bands.

16. In a multi-frequency tuning system, as set forth in claim 10, having a rotatable adjusting means for each of said structures whereby the structures may be set at points to prevent repetition or overlapping on the tuning dial.

17. In a multi-frequency tuning system for covering various frequency ranges, a bank of groups of condenser units, each unit of a group including ganged rotors and ganged stators, each associated with a rotor, and each stator insulated from each other stator, one group of units tuning the same portion of the spectrum and a portion different from that tuned by any of the other groups, a rotatable means common to the gangs of rotors, said gangs of rotors being angularly disposed with respect to and arranged in staggered relation about said means, the gangs of rotors tuning the same portion of the spectrum bearing the same angular relation to each other, each higher or lower range tuning group of units being disposed in a progressively staggered relation, said groups of gangs of rotors being so arranged about said rotatable means that when the latter is rotated 360° each group of gangs of rotors progress through their associated gangs of stators in a direction which produces an increasing or decreasing frequency range, a normally open pair of circuit closing units suspended from said rotatable means for each group of condenser units and arranged adjacent to the latter, and a rotatable operating device for each pair of circuit closing units, each of said devices forming a part of said rotatable means and including a pair of spaced elements for simultaneously closing the pair of circuit closing units with which the device is associated, the said spaced elements of said devices being disposed about said rotatable means in staggered relation with respect to each other and corresponding in arrangements to the staggered arrangement of said groups of gangs of rotors whereby on the operation of said rotatable means the closing of one pair of circuit closing units will be had on the opening of an adjacent pair of circuit closing units.

18. In a multi-frequency tuning system as set forth in claim 17, having the said rotatable means thereof consisting of a series of aligned shafts electrically insulated from each other shaft, a coupling means between an intermediate pair of said shafts and the circuit closing units operating devices, the said devices connecting the other of said shafts together and to the said intermediate shafts.

WEBSTER I. CARPENTER.